United States Patent
Basaldua (10) Patent No.: US 11,351,872 B1
(45) Date of Patent: Jun. 7, 2022

(54) AUTOMATED ACCELERATION WITH GRADUAL REDUCTION

(71) Applicant: Euphree, Inc., Houston, TX (US)

(72) Inventor: Daniel Basaldua, Houston, TX (US)

(73) Assignee: Euphree, Inc., Houston, TX (US)

( * ) Notice: Subject to any disclaimer, the term of this patent is extended or adjusted under 35 U.S.C. 154(b) by 0 days.

(21) Appl. No.: 17/478,010

(22) Filed: Sep. 17, 2021

(51) Int. Cl.
*B60L 15/20* (2006.01)
*B62M 6/50* (2010.01)

(52) U.S. Cl.
CPC .......... *B60L 15/2072* (2013.01); *B62M 6/50* (2013.01); *B60L 2200/46* (2013.01); *B60L 2240/12* (2013.01); *B60L 2240/14* (2013.01); *B60L 2250/26* (2013.01); *B60L 2260/26* (2013.01)

(58) Field of Classification Search
CPC ... B62M 6/50; B60L 15/2072; B60L 2200/46; B60L 2240/12; B60L 2240/14; B60L 2250/26; B60L 2260/26
See application file for complete search history.

(56) References Cited

U.S. PATENT DOCUMENTS

| | | | |
|---|---|---|---|
| 5,777,442 A | | 7/1998 | Miyata |
| 5,922,035 A | * | 7/1999 | Chen ..................... B62M 6/60 701/22 |
| 9,663,177 B2 | | 5/2017 | Craven et al. |
| 10,501,146 B2 | | 12/2019 | Kumar et al. |
| 2012/0145469 A1 | * | 6/2012 | Tong ........................ B62M 1/26 180/206.1 |
| 2012/0217758 A1 | * | 8/2012 | Chen ..................... A63B 21/225 290/1 C |
| 2013/0311020 A1 | * | 11/2013 | Searles ..................... B62M 6/50 701/22 |
| 2018/0022411 A1 | * | 1/2018 | Kistemaker .............. B62J 17/04 180/208 |
| 2019/0308512 A1 | * | 10/2019 | Hasumi .................... B62M 6/45 |
| 2020/0139805 A1 | | 5/2020 | Biderman et al. |
| 2020/0238129 A1 | * | 7/2020 | Hare .................. A63B 21/4049 |

FOREIGN PATENT DOCUMENTS

| | | |
|---|---|---|
| CN | 108725682 B | 1/2020 |
| DE | 102013214169 A1 | 1/2015 |
| EP | 3587235 A1 | 1/2020 |
| WO | 2019123162 A1 | 6/2019 |

OTHER PUBLICATIONS

Muetze, A. & Tan, Ying. (2007). Electric bicycles—A performance evaluation. Industry Applications Magazine, IEEE. 13. 12-21. 10.1109/MIA.2007.4283505.

* cited by examiner

Primary Examiner — Tyler J Lee
(74) Attorney, Agent, or Firm — Stephen Y. Liu; Carstens & Cahoon, LLP (57) ABSTRACT

The disclosed principles provide for acceleration systems and related methods for use with power assisted vehicles, such as E-Bikes. Disclosed systems and methods provide for a quick ramp up feature that accelerates the vehicle at a predetermined acceleration rate, but then smoothly integrates into the target cruising speed of the current speed mode by incrementally reducing the rate of acceleration as the vehicle approaches the target cruising speed, thereby reducing or eliminating any jolt or jerky feeling felt during the transition from acceleration to target cruising speed.

20 Claims, 4 Drawing Sheets

AUTOMATED ACCELERATION WITH GRADUAL REDUCTION

TECHNICAL FIELD

The present disclosure relates in general to the field of E-Bikes, and more particularly to systems and related methods providing a smooth ramp up acceleration mode providing incremental reductions in rate of acceleration.

BACKGROUND

Types of vehicles that are manually powered include wheelchairs, water vehicles, and of course bicycles. Both wheelchairs and water vehicles have long ago moved to electric power or otherwise motorized options, and recently there is an increased interest in employing electrically powered bicycles that assist the operator in propelling the bicycle. In particular, rather than simply converting manual bicycles to fully motorized bicycles, the interest is in providing a power assist feature on an otherwise manual bicycle. By employing a power assist feature, it is possible for persons who might not otherwise be able to use a manual bicycle to enjoy the benefits of riding a bicycle. Such so-called "E-Bikes" have therefore become more prominent over the last several years.

Conventionally available E-Bikes all have in common some type of power assist feature, where an electric motor is employed to supplement the manual pedaling of the rider. However, how each type of E-Bike provides the power assist can differ. One popular type of power assist utilizes a sensor, such as a torque sensor, at the base of the crankshaft of one or both pedals of the E-Bike. Such sensor(s) senses the input force exerted by the rider as they operate the pedals. As this input force is detected, a computing device mounted on the E-Bike employs the electric motor to generate an amount of power assist that is directly proportional to the sensed input force provided by the rider. As a result, as a rider increases the amount of force they apply to the pedals, for example, as would be needed to start the E-Bike from a stand still as compared to the amount of force needed to maintain a particular speed, the amount of power assist provided is increased. Conversely, as the E-Bike's speed is increased, the rider will typically reduce the amount of force they apply to the pedals, and thus the amount power assist applied is proportionally reduced. And if the rider is "coasting" on the E-Bike and thus not operating the pedals at all, no power assist will be provided. While other types of power assist also exists where the amount of power assist provided varies in response to certain conditions and various other features, the general principle of providing power assist on an E-Bike remains unchanged.

In addition, to varying the amount of power assist provided based on the detected amount of force provided by the rider, most E-Bikes also have a throttle as well. Such a throttle functions in the same manner that a throttle would be for any fully motorized motor bike or motorcycle in that the rider applies the throttle to increase the motorized acceleration of the cycle until a desired speed is reached, at which point the rider release the throttle. Such a feature on an E-Bike is useful for quickly accelerating the E-Bike up to a desired speed regardless if any input force is provided by the rider at all. Moreover, some E-Bike throttles may also be variable where the amount of acceleration provided when employing the throttle is proportional to the amount of force applied to the throttle during its operation.

Despite the advancements in E-Bike technology discussed above, there are still some limitations or disadvantages to be found in conventionally available E-Bikes. For example, as the throttle is employed, even if it has variable amounts of acceleration, the rider is required to continuously manually operate the throttle in order to continue to accelerate the E-Bike up to the desired speed. Thus, even if a particular speed mode is selected, where the E-Bike only provides power assist only up to a speed within the selected mode, the rider must not only continuously manually operate the throttle to accelerate the E-Bike up to the desired speed, but also if the rider mistakenly operates the throttle after that speed is reached, the E-Bike will simply keep accelerating beyond a speed the rider may feel comfortable with, and thus a dangerous situation can arise. This is especially problematic in those situations when a rider temporarily panics while operating the throttle, for whatever reason, and thus unintendedly causes the E-Bike to reach a dangerous speed.

In addition, even when the rider of the E-Bike is fully capable of releasing their manual operation of the throttle when the desired speed is reached, users of E-Bikes are all-to-familiar with the jerky, sudden loss of acceleration when the manual operation of the throttle is ceased by the rider. In these common situations, the sudden loss of the acceleration provided when the throttle is released causes the momentum of the weight of the rider to continue to move forward, thus creating the jerky/jolting and uncomfortable feeling. In many cases, this sudden decrease in acceleration can even feel as though the brakes of the E-Bike were applied, which is undoubtedly uncomfortable, and thus undesirable, for the rider. Moreover, such a sudden, jerky movement can cause stability issues for the rider, which could in extreme cases lead to loss of control of the E-Bike.

Accordingly, what is needed in the art is an E-Bike having a control system, and related methods for controlling the electric power of the E-Bike, that do not suffer from these deficiencies found in the prior art. The disclosed principles provide such systems and methods.

SUMMARY

In order to overcome the deficiencies of the prior art, the disclosed principles provide for acceleration systems and related methods for use with power assisted vehicles, such as E-Bikes. Disclosed systems and methods provide for a smooth ramp up feature that accelerates the vehicle at a predetermined acceleration rate, but then smoothly integrates into the target cruising speed of the current speed mode by incrementally reducing the rate of acceleration as the vehicle approaches the target cruising speed, thereby reducing or eliminating any jolt or jerky feeling felt during the transition from acceleration to target cruising speed. For example, as the speed of the E-Bike approaches the target speed, the amount of acceleration is decreased by a predetermined amount, with an incremental reduction in rate of acceleration as the speed of the E-Bike continues to increase towards the target speed. Once the target speed is reached, the disclosed principles may then transition the E-Bike from acceleration mode to power assist mode.

In one embodiment, the disclosed principles provide for an electric power assist system for a manually powerable ridden vehicle. The exemplary system may comprise a motorized propulsion subsystem for propelling the vehicle, and a plurality of speed modes having a corresponding maximum speed of movement of the vehicle for each speed mode provided by the motorized propulsion subsystem. In addition, the system may include a controller or control system controlling operation of the motorized propulsion subsystem, and controlling acceleration of the vehicle based on operation of an acceleration system constructed as disclosed herein. Such an acceleration system may comprises a manual acceleration device causing the control system to provide acceleration of the vehicle, using the motorized propulsion subsystem, while the manual acceleration device is operated by the rider, and an automatic acceleration device causing the control system to provide automatic acceleration of the vehicle up to the maximum speed for a currently selected speed mode based on a single activation of the automatic acceleration device by the rider and without operation of a braking device of the vehicle after the single activation. The control system provides the automatic acceleration using a smooth ramp up process as disclosed herein. This smooth ramp up process may comprise providing the automatic acceleration at a maximum acceleration rate of the motorized propulsion subsystem from a current speed of the vehicle up to a percentage of the maximum speed for the currently selected speed mode, and thereafter incrementally reducing the acceleration rate from the percentage of the maximum speed up to the maximum speed for the currently selected speed mode wherein no further acceleration is provided.

In one advantageous embodiment, an acceleration system as disclosed herein may provide the smooth ramp up process to incrementally reduce the acceleration rate by providing the automatic acceleration at a maximum acceleration rate of the motorized propulsion subsystem from an initial speed of the vehicle up to a first percentage of the maximum speed that is less than the maximum speed for the currently selected speed mode, and then providing the automatic acceleration at a first percentage of the maximum acceleration rate, less than the maximum acceleration rate, from the first percentage of the maximum speed up to a second percentage of the maximum speed that is greater than the first percentage of the maximum speed but less than the maximum speed for the currently selected speed mode. The smooth ramp up process may then incrementally reduce the acceleration rate by thereafter providing the automatic acceleration at a second percentage of the maximum acceleration rate, less than the first percentage of the maximum acceleration rate, from the second percentage of the maximum speed up to a third percentage of the maximum speed that is greater than the second percentage of the maximum speed but less than the maximum speed of the vehicle for the currently selected speed mode. Still further, a smooth ramp up process provided by an acceleration system as disclosed herein may further comprise providing the automatic acceleration at the maximum acceleration rate from the third percentage of the maximum speed up to the maximum speed of the vehicle for the currently selected speed mode.

In yet other embodiments, a smooth ramp up process provided by an acceleration system as disclosed herein may further comprise providing the automatic acceleration at a first percentage of the maximum acceleration rate, less than the maximum acceleration rate, of the motorized propulsion subsystem from an initial speed of the vehicle up to a second speed of the vehicle that is greater than the initial speed but less than the maximum speed of the vehicle for the currently selected speed mode, and then providing the automatic acceleration at a second percentage of the maximum acceleration rate, greater than the first percentage of the maximum acceleration rate but less than the maximum acceleration rate, from the second speed of the vehicle up to a third speed of the vehicle that is greater than the second speed but less than the maximum speed for the currently selected speed mode, and thereafter providing the automatic acceleration at a third percentage of the maximum acceleration rate, greater than the second percentage of the maximum acceleration rate but less than the maximum acceleration rate, from the third speed of the vehicle up to a fourth speed of the vehicle that is greater than the third speed but less than the maximum speed for the currently selected speed mode. Moreover, another embodiment may comprise providing the automatic acceleration at the maximum acceleration rate from the fourth speed of the vehicle up to the percentage of the maximum speed for the currently selected speed mode, and thereafter incrementally reducing the acceleration rate as disclosed herein.

BRIEF DESCRIPTION OF THE DRAWINGS

For a more complete understanding of the present invention and its advantages, reference is now made to the following description and the accompanying drawings, in which.

DETAILED DESCRIPTION

The following detailed description includes exemplary embodiments of the inventive principles disclosed herein, and reference is made to the accompanying figures that form a part hereof. The figures here are shown to only illustrate specific embodiments in which the disclosed principles may be practiced. It must be understood, however, that other embodiments may be implemented that include structural changes and modifications made without departing from the scope of the disclosed principles.

Figure 1:
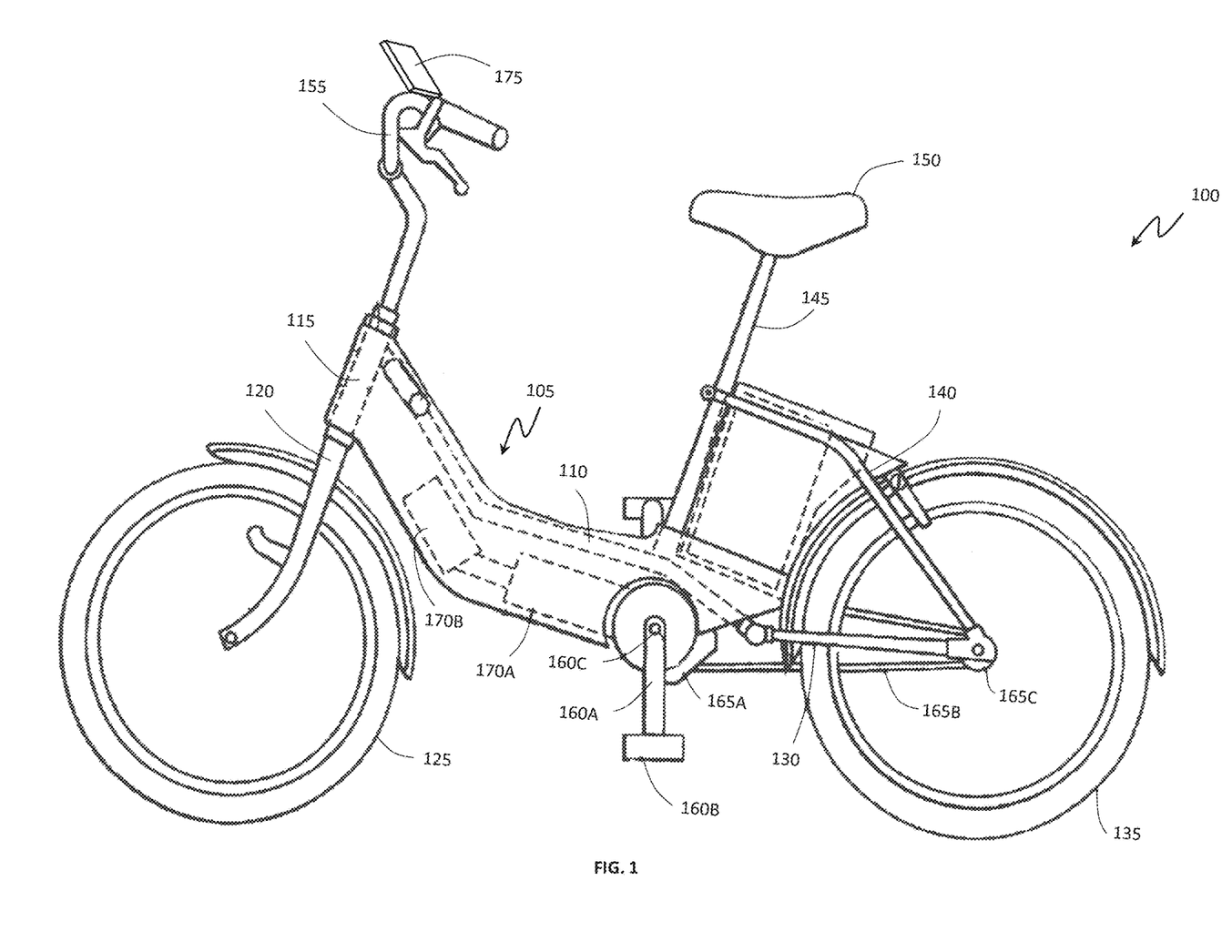
FIG. 1 illustrates a rendering of an exemplary embodiment of an electrically-powered bicycle having a Smooth Ramp Up acceleration system in accordance with the disclosed principles.

Referring first to FIG. 1, illustrated is a rendering of an exemplary embodiment of an electrically powered bicycle or "E-Bike" 100 having a Smooth Ramp Up acceleration system in accordance with the disclosed principles. Although embodiments of the disclosed system, and associated methods, are discussed herein as incorporated into an E-Bike, it should be understood that a Smooth Ramp Up system as disclosed herein may also be incorporated into other types of power-assisted vehicles having a power assist system for propelling the vehicle, without departed from the scope of the disclosed principles.

The illustrated E-Bike 100 is comprised of a frame 105 having a main tube 110 extending along the length of the E-Bike 100. At the front of the main tube 110 is a head pipe 115 for securing the front forks 120 holding the front wheel 125, while at the back of the main tube 110 is a rear wheel support consisting of rear forks 130 for securing the rear wheel 135, along with an upper support 140 connected between the rear wheel 135 and the top of a seat post 145 for providing additional structural support for the rear wheel 135. A seat 150 is adjustably supported on the seat post 145 by means of the seat post 145. Handlebars 155 are connected to the top of the head pipe 115 for steering of the front wheel 125 of the E-Bike 100.

Near the rear of the main tube 110 is a manual propulsion subsystem for driving the power assist propulsion system using manual input power from a rider of the E-Bike. In this embodiment, the manual propulsion subsystem is comprised of cranks 160A, foot pedals 160B and a crankshaft 160C used by a rider to manually pedal the E-Bike 100. Pedaling is provided by a rider via manual opposing rotation of the cranks 160A via the pedals 160B, which in turn drives the crankshaft 160C that is supported on the frame 105 such that it may rotate within the transmission 165A of the drive assembly (collectively 165) that provides the driving force for the E-Bike. The transmission 165A, which includes gearing that may be changed via a controller or control panel (discussed below), typically drives a chain 165B of the drive assembly 165. The chain 165B, in turn, drives a sprocket 165C for driving the rear wheel 135 to move the E-Bike 100. Depending on the model of E-Bike 100, the automatic transmission 165A may be any type of transmission, such as a continuously variable or a step-type transmission which both operate to vary the transmission gearing automatically. Of course, other types of transmissions, automatic or manual, may also be included. However, in accordance with E-Bikes having a power assist system as disclosed herein, an automatic transmission may be shifted in response to power assist requirements.

In addition to the manual propulsion subsystem components, the illustrated E-Bike 100 includes an electric power assist system that includes a motorized propulsion subsystem (collectively 170). The exemplary motorized propulsion subsystem 170 includes an electric motor 170A that uses electricity to drive the transmission 165A through a clutch mechanism, which may be of any advantageous type. The electric motor 170A is supplied with electrical power from an electrical power source, typically a rechargeable battery 170B such as a lithium-ion battery; however, any type of battery or other power storage device may also be employed. A control system 175 is also provided to control the operation of the motorized propulsion subsystem 170, and in this embodiment is embodied as an electronic controller 175 mounted on the handlebars such that it is easily useable by a rider of the E-Bike 100. Among the power assist functions controlled by the controller 175 is a Smooth Ramp Up acceleration mode in accordance with the disclosed principles, which is discussed in detail below.

Aside from the manual throttle available in most E-Bike power assist systems, the disclosed Smooth Ramp Up acceleration mode is provided by a unique system that smooths out the acceleration rate as the speed of the E-Bike approaches the target cruising speed. An exemplary disclosed electric power assist system, the details of which are discussed below with reference to FIG. 4, may comprise motorized propulsion subsystem having an electric motor and its power source, one or more speed sensors for sensing a speed of movement of the E-Bike, a controller, and an acceleration system for determining and providing a rate of acceleration. As used herein, the "smoothing" of the acceleration refers to the reduction in the rate of acceleration provided by the motor of the E-Bike in proportion to the how close the speed of the E-Bike is to the selected target speed. By continuously and incrementally reducing the amount or rate of acceleration being provided by the motor as the speed of E-Bike approaches the desired target speed, the jolting or jerky feeling caused by the sudden loss of acceleration when the E-Bike reaches the target speed is significantly reduced or even eliminated.

As discussed above, in conventional E-Bike power systems, the acceleration from a standstill or a lower speed up to the target speed is typically provided at a single, continuous rate. In fact, because of the initial force needed to move the weight of an E-Bike and its rider from a standstill or very slow starting speed, the rate of acceleration provided in conventional E-Bikes often increases as the E-Bike approaches the target speed. In either case, conventional acceleration systems, whether automatic up to the target speed or manually held by the rider, all provide the same or an increasing rate of acceleration until the target speed is reached. At that point, the acceleration system of conventional E-Bikes completely ceases the acceleration. However, the inertia of the weight of the rider continues to move forward at the rate of acceleration that existed when the power system ceases acceleration, thus resulting in an uncomfortable jerky movement when the E-Bike reaches the target cruising speed and the rider must reign in the inertial movement of his weight. An acceleration system as disclosed herein reduces or eliminates such uncomfortable movement, as discussed in detail below.

Figure 2:
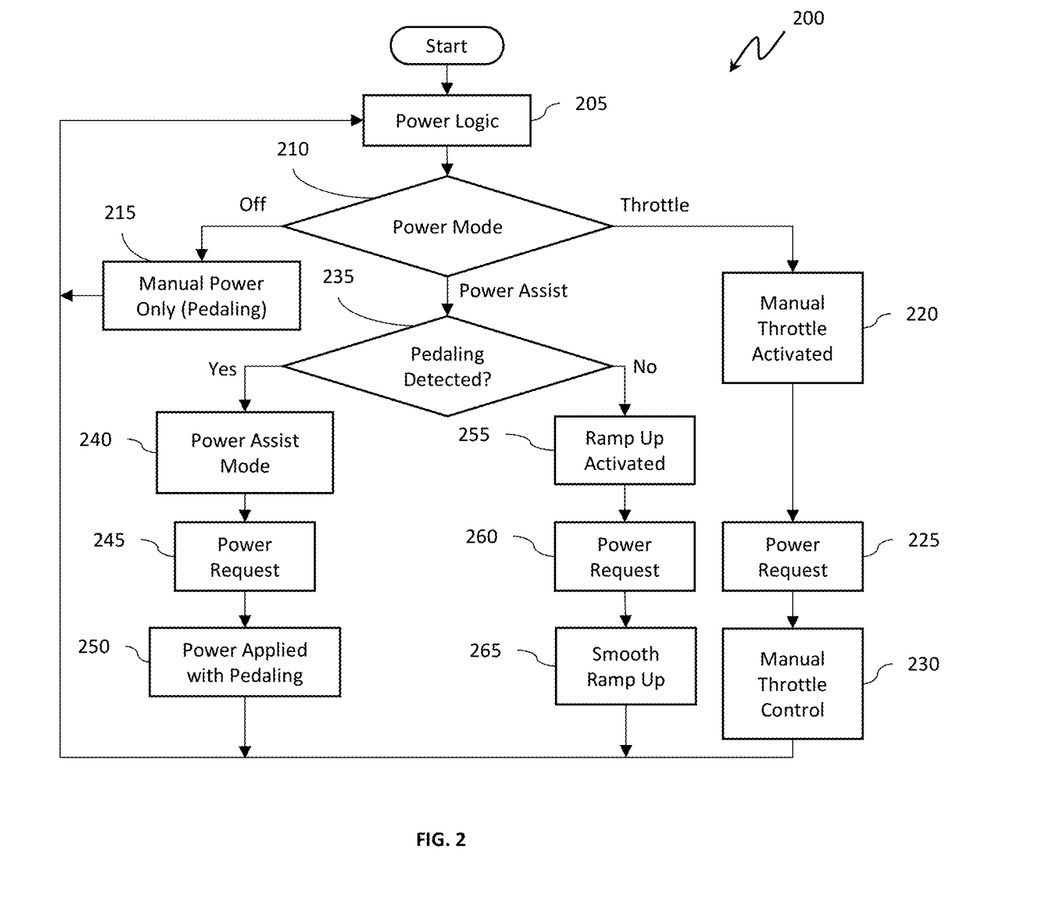
FIG. 2 illustrates a flow diagram of the logic of a power system for an E-Bike constructed in accordance with the disclosed principles.

Looking now at FIG. 2, illustrated is a flow diagram 200 of the logic of a power assist system for an E-Bike constructed in accordance with the disclosed principles. In this embodiment, the power assist system includes a Smooth Ramp Up acceleration system and related method as disclosed herein. After the exemplary logical flow starts, which could equate to turning the power assist system of the E-Bike on, the flow moves to Step 205 where the power logic of the power assist system is initiated.

Once initiated, the power logic awaits the power mode selected by the rider of the E-Bike at Step 210. In advantageous embodiments, the power mode selected is not necessarily done by manually selecting a power mode option, but is instead selected by the mere action of the rider, as described below. However, in other embodiments, the power mode is actively selected by the rider, for example, through manual selection of a mode via a touch screen, button, or other means. Regardless of the means for selecting a power mode, if at Step 210 no power assist mode is selected or an affirmative selection is made for no power assist, then the logic moves to Step 215 where the E-Bike is only manually powered by the pedaling of the rider via a manual propulsion subsystem. This manual power mode continues until a different power mode is selected or otherwise changed at Step 210.

If at Step 210 a throttle power mode is selected, the logic flow moves to Step 220. In some embodiments, a throttle mode may be again selected manually by the rider such as via a touch screen selection or button, or the throttle mode may be selected simply by the rider activating a manual acceleration device (i.e., the throttle) of the E-Bike. Regardless of how it is initiated, once the power mode is in a throttle mode, the logic flow moves to Step 225. In Step 225, the power assist system of the E-Bike is engaged via a power request. Such a power request is made by the control signal sent from the throttle control to the power system logic in the control system or controller. Once the use of the throttle has initiated the power assist system on the E-Bike, the power assist system causes the E-Bike to steadily accelerate at Step 230. This acceleration is proportional to the manipulation of the throttle control by the rider. Specifically, if the rider fully activates the throttle control and holds it in the maximum position, the power assist system continuously provides the maximum rate of acceleration available from the power assist system. However, if the rider varies the amount he activates the throttle control, the power assist system provides a rate of acceleration proportional to the amount of throttle control activation provided by the rider. Accordingly, as with conventional E-Bike power assist systems, the rate of acceleration provided by the power assist system only varies if the rider manually varies the amount of throttle control provided to the system. This throttle mode continues until a different power mode is selected or otherwise changed at Step 210, in the exemplary manners discussed above.

If at Step 210 a power assist mode is selected, the logic flow moves to Step 235. At Step 235, it is determined if one or more sensors on the E-Bike detect pedaling via the manual propulsion subsystem by the rider. If pedaling is detected at Step 235 via one or more input sensors configured to detect manual input force provided by the rider, the logic flow moves to Step 240 where the power assist system of the E-Bike enters a power assist mode. In advantageous embodiments, the power assist mode at Step 240 may apply powered assistance in the typical manner. For example, in conventional power assist modes, the power assist system applies power from the electric motor to the transmission of the E-Bike when the rider is pedaling the E-Bike. As such, when pedaling is detected by the one or more input sensor(s) of the E-Bike, a request for power from the motor is provided at Step 245. The power assist system of the E-Bike is engaged via a power request, and thus power is applied when the rider is pedaling at Step 250.

In exemplary embodiments, the amount of power assistance provided via the power request may vary based on the amount of pedaling effort being provided by the rider, and thus detected by the one or more input sensors configured to detect the manual input force provided via the manual propulsion subsystem. In such embodiments, the amount of torque that is detected at the pedal(s) of the E-Bike by the input sensor(s), which is an indicator of the amount of pedaling effort being provided by the rider, determines the amount of power assistance provided by the power assist system. Moreover, in advantageous embodiments the amount of power assistance is increased as the amount of detected torque at the pedal(s) by the input sensor(s) is increased. In these embodiments, a proportional increase in power assistance is provide because the rider is determined to be exerting increased effort, thus lessening the amount of effort needed by the rider. However, in alternative embodiments, the amount of power assistance provided may be inversely proportional to the amount of torque detected at the pedal(s).

If at Step 235 no pedaling is detected via the one or more input sensors, the logic flow moves to Step 255. At Step 355 the rider has activated the Smooth Ramp Up acceleration mode. The Smooth Ramp Up acceleration mode provides the rider ability to quickly and more easily accelerate the E-Bike up to his originally selected cruising speed. However, this unique mode differs from the typical use of the manual acceleration device (throttle) as described above in that the rider need only activate this acceleration mode via an automatic acceleration device, such as by the single press of a button, rather than continuously operating the throttle. Additionally, in accordance with the disclosed principles, the Smooth Ramp Up acceleration mode provided via the automatic acceleration device provides this acceleration up to the designated cruising speed in a manner that reduces or eliminates the jolt or jerky movement described above by providing incremental reductions in the acceleration rate as the vehicle accelerates up to the target speed. Specifically, the target cruising speed may be a specific speed (e.g., 10 mph) or may be a range of speeds (e.g., 10-13 mph). Once the rider activates the Smooth Ramp Up acceleration mode via an automatic acceleration device as discussed herein, the power logic of the E-Bike provides a power request at Step 260 to the motor of the E-Bike. Then, at Step 265 and in response to this power request, the Smooth Ramp Up acceleration mode is started.

As disclosed herein, the Smooth Ramp Up acceleration mode reduces or eliminates the jerkiness of standard throttle-based acceleration or even conventional automatic acceleration modes that merely apply maximum acceleration to the E-Bike via the electric motor up to the previously selected cruising speed where the acceleration is suddenly, and often harshly, simply cut off. As described above, once the cruising speed is reached, the conventional acceleration mode simply ceases acceleration by the motor, or the rider manually ceases operating the throttle, either of which results in the jerky movement of the E-Bike caused by the sudden loss of acceleration. In contrast, the Smooth Ramp Up acceleration mode disclosed herein provides a unique manner of reaching that target speed/range in that the rate of acceleration is incrementally reduced as the E-Bike approaches the selected cruising speed, and in proportion to how close the current speed of the E-Bike in relation to the target speed where all acceleration is ceased. Moreover, any of several techniques may be implemented to provide the disclosed gradual reduction in acceleration as the target cruising speed is reached.

With specific reference to this exemplary of Step 265 of FIG. 2, the gradual incremental reduction in acceleration in the Smooth Ramp Up mode is provided as follows. For this embodiment, the rate of acceleration provided by the full use of a manual acceleration device would be the Max Mode of the E-Bike's power system. Also, the target cruising speed, which is the maximum speed for the currently selected speed mode selected by the rider, may be designated Mode x. Thus, the rate of acceleration provided by the Smooth Ramp Up mode/system of the disclosed principles may be designated Mode y. Accordingly, when the Smooth Ramp Up acceleration mode is activated at Step 265, the motor of the E-Bike's power assist system at Mode y. Thus, the Smooth Ramp Up system would accelerate the E-Bike at Mode y=Mode Max. Alternatively, the Smooth Ramp Up system may further include a selected rate of acceleration rather than simply accelerating fully at Mode Max. For example, the disclosed system could include Acceleration Modes 1, 2, 3, 4, and 5 each of which may be an increasing rate of acceleration where Mode 5 may equal Mode Max or may be the mode just below Mode Max. Of course, any various number of acceleration modes may be provided other than simply Mode Max. Thus, in such embodiments, the Smooth Ramp Up system would accelerate the E-Bike at Mode y=Mode x+1, 2, 3, 4, up to Mode Max. With such Smooth Ramp Up systems having multiple acceleration modes, the acceleration of the automated acceleration system may provide a gradual increase in the rate of acceleration as the system moves the E-Bike to towards the target cruising speed.

Once acceleration is provided in whichever manner, the Smooth Ramp Up system would decrease the rate of acceleration as the speed of the E-Bike approaches the target cruising speed, i.e., the maximum speed for the currently selected speed mode. For example, in this embodiment at 80% of Mode x, the disclosed system may begin decelerating the ramp up acceleration rate by 50% of the difference between the ramp up acceleration rate (Mode y) and the current user program acceleration rate (Mode x). The speed of the E-Bike is detected using a speed sensor for sensing a speed of movement of the E-Bike. The rate of acceleration, whether provided at Mode Max or provided in a graduated manner, is provided, and therefore known, by the power logic circuitry. For example, the power logic of the control system provides the electric motor of the motorized propulsion subsystem with a specific control signal to cause the motor to provide the predetermined amount of acceleration, such as by varying the electrical current provided to the motor. Thus, the power logic of the control system will vary the control signal to the motor to reduce the rate of acceleration to a certain lower rate or by a percentage of the prior rate, based on the detected current speed of the E-Bike. At 90% of Mode x, the system may then begin decelerating by 75% of the difference between ramp up acceleration rate (Mode y) and the current user program acceleration rate (Mode x). The Smooth Ramp Up system may continue to incrementally decrease the rate of acceleration in a similar manner, such as at 95% of Mode x, until rider is at the target cruising speed (Mode x). Any number of decelerations, or otherwise decreases in rate of acceleration, may be configured in the disclosed system or process. Then, once the target cruising speed is reached, the system will hold the final cruising speed (Mode x) until the cruising speed or mode of operation is changed by the rider, until the rider begins pedaling, or perhaps when a predetermined amount of time elapses with no pedaling being detected. In sum, a Smooth Ramp Up system or process in accordance with the disclosed principles mitigates or eliminates the jolt imparted on the rider when the rate of acceleration of the E-Bike transitions from the full rate of acceleration up to their target cruising speed and then the sudden ceasing of acceleration.

Figure 3:
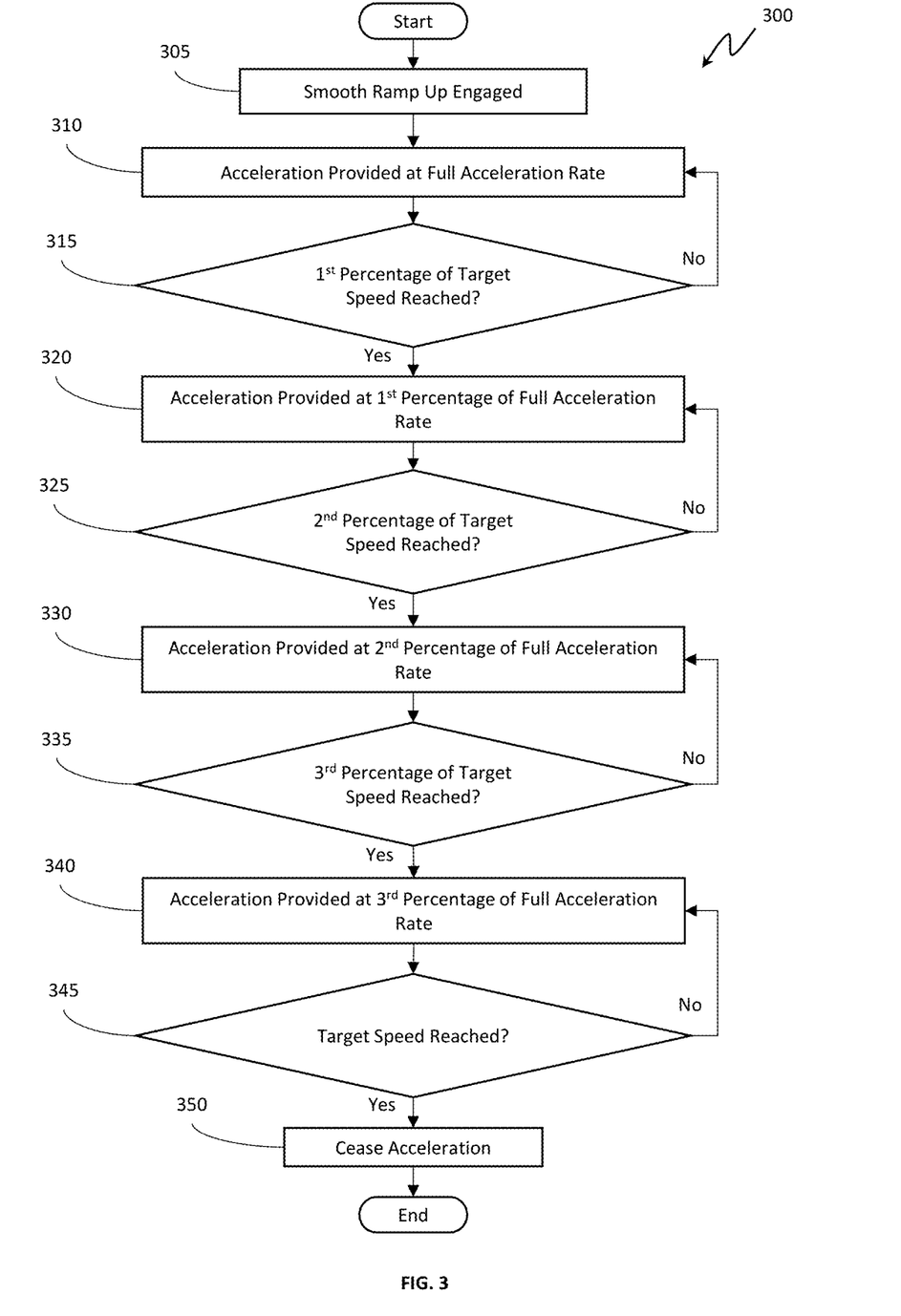
FIG. 3 illustrates a flow diagram of another exemplary embodiment of a Smooth Ramp Up acceleration process executed in accordance with the disclosed principles.

Turning now to FIG. 3, illustrated is a flow diagram 300 of another exemplary embodiment of a Smooth Ramp Up acceleration process executed in accordance with the disclosed principles. After the exemplary flow is started, in the first Step 305 the rider again manually initiates the Smooth Ramp Up acceleration mode via an automatic acceleration device. As discussed above, the manual initiation by the rider may be done in any of a number of manners, such as the single push of a dedicated button. Of course, also as discussed above, any number of other ways to initiate the Smooth Ramp Up acceleration as disclosed herein may be implemented without departing from the scope of the disclosed principles.

Moving on to Step 310, after the user manually selects the Smooth Ramp Up acceleration feature, the disclosed principles cause the electric motor of the E-Bike to propel the E-Bike in the manner described herein. In exemplary embodiments, the Smooth Ramp Up system causes the electric motor to provide the acceleration at the full acceleration rate. In advantageous embodiments, the Smooth Ramp Up acceleration system will cause the E-Bike to accelerate even without the user pedaling. In other embodiments, the Smooth Ramp Up acceleration feature may function even with the rider pedaling. Also in advantageous embodiments, the Smooth Ramp Up acceleration feature, once activated, will cause the E-Bike to accelerate at the maximum velocity permitted by the motor and gearing present in the particular E-Bike. Of course, in other embodiments such the embodiment discussed above with reference to FIG. 2, the velocity of the acceleration may be varied with a lesser rate of acceleration at the beginning of the Smooth Ramp Up acceleration process and incrementally increasing as the E-Bike continues to accelerate up towards the target speed. In such embodiments, the Smooth Ramp Up acceleration system can therefore also provide a less jerky feeling at the initial part of the Smooth Ramp Up acceleration process than felt when the acceleration is simply provided at the maximum rate where the rider experiences a feeling of being pushed backwards. Similarly, this smoother manner of acceleration when using the disclosed Smooth Ramp Up acceleration system eliminates the need for the rider to try to regulate the amount of acceleration manually, thereby further increasing the enjoyment and ease of their ride.

Moving on to Step 315, the acceleration provided by the disclosed Smooth Ramp Up acceleration feature continues to accelerate the E-Bike towards the maximum speed for the currently selected speed mode (i.e., the target cruising speed), where as described above, the rate of acceleration may vary based on the capabilities of the power system's logic. As before, the target cruising speed may be a specific speed (e.g., 10 mph) or may be a range of speeds (e.g., 10-13 mph). Also as disclosed above, the Smooth Ramp Up acceleration system provides a unique manner of reaching that maximum speed/range for the currently selected speed mode in that the rate of acceleration is gradually and incrementally reduced as the E-Bike approaches the selected maximum cruising speed. At Step 315, in this embodiment of providing the smooth ramp up acceleration, the logic of the Smooth Ramp Up system determines whether a $1^{st}$ percentage of the entered target cruising speed has been reached. If the $1^{st}$ percentage of the target speed has not yet been reached, then the Smooth Ramp Up system continues to cause the motor of the E-Bike to provide acceleration at the full standard acceleration rate. Started another way, the Smooth Ramp Up system provides automatic acceleration at a maximum acceleration rate of the motorized propulsion subsystem of the E-Bike from an initial speed of the E-Bike to a $1^{st}$ percentage of the maximum speed that is less than the maximum speed for the currently selected speed mode.

Once it is determined at Step 315 that the $1^{st}$ percentage of the target speed has been reached, in Step 320 the Smooth Ramp Up acceleration system reduces the amount of acceleration to a $1^{st}$ percentage of the standard acceleration rate. For example, in an advantageous embodiment where the target cruising speed is 10 mph, the Smooth Ramp Up acceleration system reduces the acceleration rate to 75% of the standard acceleration rate when 80% of the target cruising speed is achieved. Thus, the full acceleration rate originally provided by the Smooth Ramp Up acceleration system would then be reduced to only 75% of the standard acceleration rate when the speed of 8 mph (80% of 10 mph) is reached.

Next, in Step 325, as the Smooth Ramp Up acceleration system continues to accelerate the E-Bike towards the target cruising speed at 75% of the standard acceleration rate, the logic of the Smooth Ramp Up system determines whether the $2^{nd}$ percentage of the target cruising speed has been reached. If the $2^{nd}$ percentage has not yet been reached, then the Smooth Ramp Up system continues to cause the motor of the E-Bike to provide acceleration at the $1^{st}$ percentage of the full standard acceleration rate. Thus, the Smooth Ramp Up system provides automatic acceleration at the $1^{st}$ percentage of the maximum acceleration rate, less than the maximum acceleration rate, from the $1^{st}$ percentage of the maximum speed up to a $2^{nd}$ percentage of the maximum speed that is greater than the $1^{st}$ percentage of the maximum speed but less than the maximum speed for the currently selected speed mode.

However, if it is determined at Step 325 that the $2^{nd}$ percentage of the target speed has been reached, in Step 330 the Smooth Ramp Up acceleration system reduces the amount of acceleration to a $2^{nd}$ percentage of the standard acceleration rate. In this exemplary embodiment where the target cruising speed is 10 mph, the Smooth Ramp Up acceleration system reduces the acceleration rate to 50% of the standard acceleration rate when 90% of the target cruising speed is achieved. Thus, the continued acceleration provided by the Smooth Ramp Up acceleration system would then be reduced to only 50% of the standard acceleration rate when the speed of 9 mph (90% of 10 mph) is reached.

In Step 335, as the Smooth Ramp Up acceleration system again continues to accelerate the E-Bike towards the target cruising speed at 50% of the standard acceleration rate, the power control logic of the Smooth Ramp Up acceleration system determines whether the $3^{rd}$ percentage of the target cruising speed has been reached. If the $3^{rd}$ percentage has not yet been reached, then the Smooth Ramp Up system continues to cause the motor of the E-Bike to provide acceleration at the $2^{nd}$ percentage of the full standard acceleration rate. Accordingly, the Smooth Ramp Up system provides automatic acceleration at the $2^{nd}$ percentage of the maximum acceleration rate, less than the $1^{st}$ percentage of the maximum acceleration rate, from the $2^{nd}$ percentage of the maximum speed up to a $3^{rd}$ percentage of the maximum speed that is greater than the $2^{nd}$ percentage of the maximum speed but less than the maximum speed of the vehicle for the currently selected speed mode.

Once it is determined at Step 325 that the $3^{rd}$ percentage of the target speed has been reached, in Step 340 the Smooth Ramp Up acceleration system reduces the amount of acceleration to a $3^{rd}$ percentage of the standard acceleration rate. In this exemplary embodiment where the target cruising speed is 10 mph, the Smooth Ramp Up acceleration system reduces the acceleration rate to 25% of the standard acceleration rate when 95% of the target cruising speed is achieved. Thus, the continued acceleration provided by the Smooth Ramp Up acceleration system would then be reduced to only 25% of the standard acceleration rate when the speed of 9.5 mph (95% of 10 mph) is reached. Thus, the Smooth Ramp Up system provides automatic acceleration at a $3^{rd}$ percentage of the maximum acceleration rate, less than the $2^{nd}$ percentage of the maximum acceleration rate, from the $3^{rd}$ percentage of the maximum speed up to the maximum speed of the vehicle for the currently selected speed mode.

At Step 345, the Smooth Ramp Up acceleration system determines if the target cruising speed has been reached. If the target cruising speed has not yet been reached, then the Smooth Ramp Up system continues to cause the motor of the E-Bike to provide acceleration at the $3^{rd}$ percentage of the full standard acceleration rate. However, if it is determined that the target cruising speed has been reached, then in Step 350 the Smooth Ramp Up acceleration system discontinues the acceleration of the E-Bike because the target cruising speed (i.e., the maximum speed of the E-Bike for the currently selected speed mode) has been reached. While no further acceleration in speed is provided, in this embodiment the disclosed system is configured to maintain the now-reached target cruising speed. Thus, the exemplary process of Smooth Ramp Up automated acceleration process in accordance with the disclosed principles then ends until activated again by the rider when desired.

In accordance with the disclosed principles, since the acceleration rate has been reduced three different times during the ramp up in speed towards the target speed, when the acceleration completely ceases when the target speed is attained, the elimination of acceleration is far less felt by the rider. This is because the transition from the full acceleration rate to no acceleration at all is more sudden, and thus noticeably jerky, as felt by the rider, than a transition from 25% of the standard acceleration rate (as in this embodiment) to no acceleration at all when the target speed is reached. As a result, a Smooth Ramp Up acceleration system or process in accordance with the disclosed principles provides a far smoother transition from the acceleration state of an E-Bike to no acceleration being provided once the target speed is reached since the rate of acceleration is progressively reduced as the speed of the E-Bike approaches the target cruising speed.

It must be understood that the process illustrated in the flow diagrams of FIG. 2 and FIG. 3 are only illustrative of the disclosed principles and are not intended to be limited to only a specific number of reductions in acceleration rate, or to only a specific manner of determining when, and by how much, reductions in the rate of acceleration should occur. Thus, while only three incremental reductions in acceleration rate in accordance with the disclosed system are illustrated in FIG. 3, the disclosed principles of the Smooth Ramp Up acceleration system may include any number of reductions in acceleration rate. Moreover, any percentages may be implemented for both the reduction in the acceleration rate and at what percentage of the target cruising speed each reduction step occurs. Furthermore, those percentages may be fractional as well as whole numbers, as each embodiment of a system as disclosed herein is implemented.

Still further, the number of reductions in acceleration rate may be dependent on the amount of the target cruising speed originally selected. Thus, while three reductions in the acceleration rate may be employed (e.g., 75%, 50% and 25% of the standard acceleration rate) when the target cruising speed is 10 mph, the number of reductions in the acceleration rate may be greater as the target cruising speed is increased. Thus, as the target cruising speed is increased, the number of reductions in the acceleration rate may be proportionally increased. For example, if the target cruising speed is 20 mph, there may be six reductions in the acceleration rate (e.g., 80%, 70%, 60%, 50%, 40% and 30% of the standard acceleration rate) as the E-Bike is accelerated towards that higher target cruising speed. Of course, any number of reductions in acceleration rate may be employed for any given target cruising speed, as the number of reductions may be directly proportional to the amount of the target cruising speed.

Moreover, the number of reductions may be directly proportional to the amount of the target cruising speed the vehicle is determined to be traveling at each incremental period by a predetermined incremental value, such as each 1 mph of target speed, each fraction of every 1 mph, or any incremental value of mph of target cruising speed. In such embodiments, the Smooth Ramp Up acceleration system or process as disclosed herein would provide an even more smooth transition from the full acceleration rate to no acceleration at all once the target cruising speed is reached since the rate of acceleration would be steadily and incrementally reduced in proportion to every incremental value of the target cruising speed. For example, in addition to providing disclosed systems with four, five or more reductions in acceleration rate, a Smooth Ramp Up acceleration system as disclosed herein may be configured to provide a corresponding small incremental reduction in acceleration rate at every 0.1 mph of increase in speed towards the target cruising speed, beginning a predetermined percentage of the target cruising speed. In accordance with the disclosed principles, as the number of these incremental reductions in acceleration rate is increased, the smoother (and less detectable by the rider) the transition will be from start of acceleration to no acceleration at all once the target speed is achieved.

Still further, the beginning of the acceleration process may also be proportional to the increasing speed of the E-Bike in a similar manner. Such an additional Smooth Ramp Up acceleration process as disclosed herein would reduce or eliminate the jerky feeling or jolt felt by the rider when the acceleration process is simply started at the full acceleration rate, which is caused by the lack of inertia in the rider's body (i.e., the body's tendency to stay still) as the E-Bike begins to quickly accelerate. For example, in such an embodiment where the target cruising speed is 17 mph to 20 mph, the rate of acceleration could be only 25% of the full acceleration rate when the initial speed of the E-Bike is 0 mph or perhaps a range of 0 mph to 3 mph. Once the speed of the E-Bike reaches a predetermined speed, such as 3 mph, the rate of acceleration may be increased to 50% of the full acceleration rate. Thus, stated another way, this additional Smooth Ramp Up acceleration process may provide automatic acceleration at a first percentage of the maximum acceleration rate, less than the maximum acceleration rate, of the motorized propulsion subsystem from an initial speed of the E-Bike up to a second speed of the E-Bike that is greater than the initial speed but less than the maximum speed of the E-Bike for the currently selected speed mode.

This increased acceleration rate may be maintained until a higher speed is reached, such as 5 mph or perhaps a range of 5 mph to 7 mph. Similarly, when the speed of the E-Bike reaches that next threshold, such as 7 mph, the rate of acceleration may be further increased to 75% of the full acceleration rate. Accordingly, the additional Smooth Ramp Up process may provide automatic acceleration at a second percentage of the maximum acceleration rate, greater than the first percentage of the maximum acceleration rate but less than the maximum acceleration rate, from the second speed of the E-Bike up to a third speed of the E-Bike that is greater than the second speed but less than the maximum speed for the currently selected speed mode. This increased acceleration rate may be maintained until the next higher threshold speed is reached, such as 10 mph or perhaps a new, higher range. Thus, the additional Smooth Ramp Up process may then provide automatic acceleration at a third percentage of the maximum acceleration rate, greater than the second percentage of the maximum acceleration rate but less than the maximum acceleration rate, from the third speed of the E-Bike up to a fourth speed of the E-Bike that is greater than the third speed but less than the maximum speed for the currently selected speed mode.

Once the speed of the E-Bike reaches the highest predetermined threshold speed, the rate of acceleration may then finally be increased to 100% of the full acceleration rate. This increased acceleration rate may be maintained until the speed of the E-Bike begins to approach the target cruising speed previously set by the rider. Therefore, the additional Smooth Ramp Up process provides automatic acceleration at the maximum acceleration rate from the fourth speed of the E-Bike up to the percentage of the maximum speed for the currently selected speed mode that causes the above-described incremental reducing of the acceleration rate according to the disclosed principles. As a result, as the E-Bike continues to accelerate at the full acceleration rate, a reduction in the acceleration rate as the E-Bike approaches the target cruising speed may then be provided in one of the manners discussed in detail above. Therefore, in these embodiments, the jerky or jolting movements that are felt by the rider of a conventional E-Bike at the start of the acceleration process and at the end of the acceleration process are both reduced or eliminated by a Smooth Ramp Up system as disclosed herein.

Figure 4:
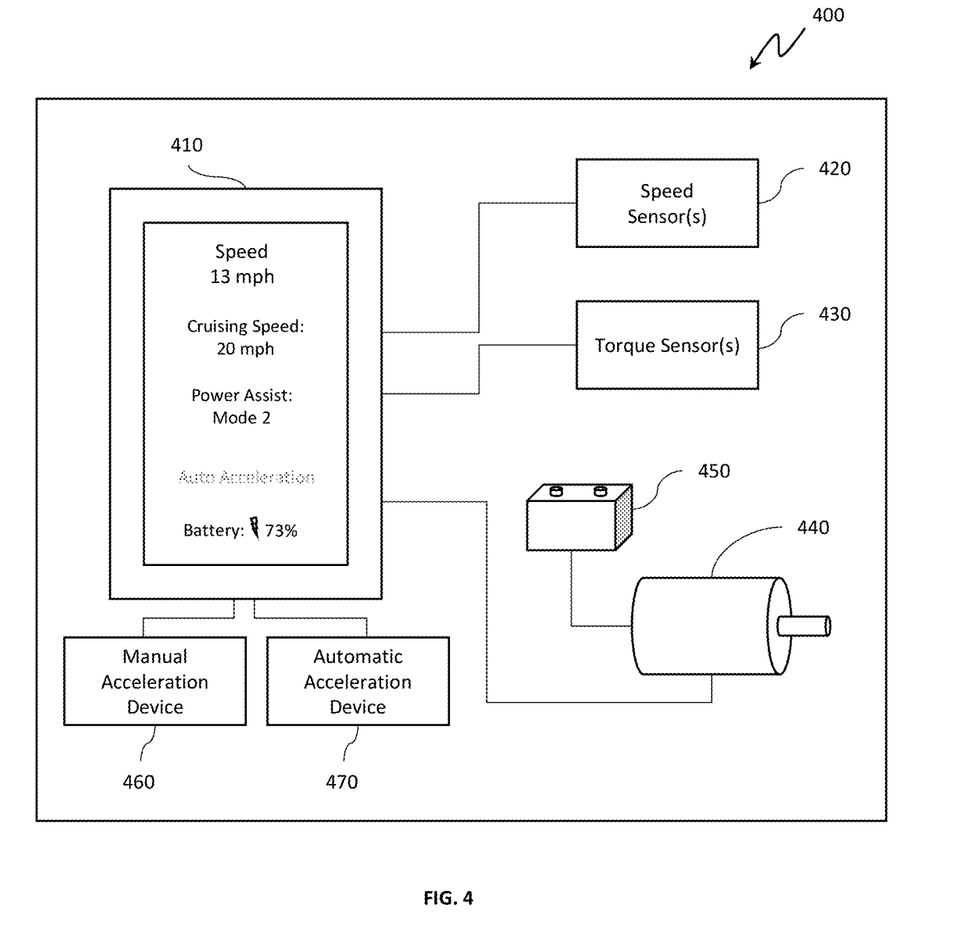
FIG. 4 illustrates an exemplary power assist system having a Smooth Ramp Up acceleration system configured to provide the Smooth Ramp Up acceleration feature in accordance with the principles disclosed herein.

Turning now to FIG. 4, illustrated is an exemplary power assist system 400 having a Smooth Ramp Up acceleration system configured to provide the Smooth Ramp Up acceleration feature in accordance with the principles disclosed herein. Initially, the exemplary power assist system 400 includes a control system or controller 410. The controller 410 is a computer-based processing device comprising both software and hardware to control a number of various features of the E-Bike on which it is mounted, as well as to provide information to the rider during use. Additionally, the controller 410 is configured to receive input information from the rider for use with the both the software and hardware (and firmware) of the controller 410.

Exemplary software executed by the controller 410 could include programs used to control the power assist feature of the E-Bike and to provide the Smooth Ramp Up feature disclosed herein, as well as software used to display information on the graphical user interface. Exemplary hardware within the controller 410 would be not only the components needed to provide the computing power of the controller 410, such as one or more processors, memory/storage and input/output interfaces, but also the power circuitry used to vary the amount of power assist provided for the E-Bike and the logic circuitry needed to determine the amounts of power required during manual throttle use, during power-assisted pedaling and during the Smooth Ramp Up acceleration mode(s) disclosed herein.

The power assist system 400 further includes one or more speed sensors 420. The speed sensor(s) may be any type of conventionally known or later developed device used to help determine the rate of speed the E-Bike on which the system 400 is mounted is travelling. For example, the speed sensor(s) 420 may be a device configured to detect the amount of rotational movement of a component of the E-Bike, such as one of the axles of the wheels. That amount of rotational movement may then be provided to the controller 410, which in turn includes hardware and software configured to covert that amount of rotational movement into the speed the E-Bike is travelling. Alternatively, the speed sensor(s) 420 may be configured to covert that amount of rotational movement into the speed of the E-Bike. Still further, the speed sensor(s) 420 may be configured to provide its data to a third device (not illustrated) that determines the speed from the data, where the speed determined by such a third device is provided to the controller 410. In sum, any type of speed sensor(s) 420 may be incorporated in the Smooth Ramp Up system disclosed herein without departing from the scope of the disclosed principles. Once the speed the E-Bike is travelling is known by the controller 410, the controller 410 can use that information for a number of features. These may include displaying the current speed on a display screen, determining if the preset cruising speed has been reached, and for the Smooth Ramp Up mode(s) discussed above.

The system 400 may also include one or more torque sensor(s) 430. As discussed above, one or more torque sensors 430 may be included on the E-Bike, such as proximate to the crankshaft of the E-Bike, to assist in determining the amount of torque being provided by the rider via the manual propulsion subsystem (e.g., the pedals, cranks and crankshaft) of the E-Bike. In some embodiments, such a torque sensor(s) 430 may be implemented as described above to assist in determining if a Smooth Ramp Up mode as disclosed herein should be continued or not once it begins.

Also included in the illustrated embodiment of the power assist system 400 is an electric motor 440. The electric motor 440 may be of the conventional type typically found in current E-Bikes, but electric motors 440 developed later with new technology may also be included in a system 400 as disclosed herein. As discussed above, the electric motor 440 is used to drive the wheel or wheels of the E-Bike, such as via a transmission, in response to the power signals provided by the controller 410. In addition, a rechargeable battery 450 is included in the exemplary system 400 to provide the electric power to the motor 440.

An exemplary power assist system 400 having a Smooth Ramp Up acceleration feature as disclosed herein includes an acceleration system having both a manual acceleration device 460, such as a throttle, and an automatic acceleration device, such as a push button 470. The manual acceleration device 460 is manually operated by the rider of the E-Bike in a continuous manner in order to obtain a desired rate of acceleration, and for an amount of desired time, of the rider. However, the automatic acceleration device 470 is provided as disclosed herein, and permits the rider to initiate the Smooth Ramp Up acceleration feature disclosed herein by a single activation of the automatic acceleration device. As illustrated, the controller 410 may include a display feature that illuminates when the Smooth Ramp Up acceleration feature is activated, and remains unilluminated (as shown in FIG. 4) when the Smooth Ramp Up acceleration feature is not currently activated. In exemplary embodiments, the automatic acceleration device 470 is a button, e.g., proximate the location of the throttle, that the rider need only push once to initiate the Smooth Ramp Up acceleration feature. Such activation triggers the logic circuitry within the controller 410 to initiate the Smooth Ramp Up acceleration process as disclosed herein using the speed sensor(s) 420, the motor 440 and its power source 450, and the data regarding the current cruising speed mode selected by the rider.

Also included in the power assist system 400 is a manner for determining the rate of acceleration of the E-Bike for use when the Smooth Ramp Up acceleration feature disclosed herein is activated via the automatic acceleration device 470. For example, the speed sensor(s) 420 along with an internal timer within the controller 410 may be used by the processor of the controller 410 to determine at any given moment what the rate of acceleration (i.e., the rate of change in velocity with respect to time) of the E-Bike would be. Of course, in other embodiments of the system 400, the rate of acceleration may be provided by an accelerometer, which may be either internal or external to the controller 410. In yet other embodiments of the system 400, the rate of acceleration may be determined by a position-sensing device, which could determine acceleration based on the positional movement of the E-Bike over a given amount of time. Regardless of the device(s) and manner for determining the rate of acceleration of the E-Bike, the power assist system 400 employs the acceleration data in the manner described above to provide the gradual reduction in rate of acceleration as the target cruising speed is reached. Moreover, the system 400 may also employ this acceleration data to provide the gradual increase in rate of acceleration as the E-Bike begins moves from zero or a low initial speed towards the target cruising speed, also as described above.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, and by way of example, although the headings refer to a "Technical Field," the claims should not be limited by the language chosen under this heading to describe the so-called field. Further, a description of a technology as background information is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure but should not be constrained by the headings set forth herein.

Moreover, the Abstract is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the claims reflect, inventive subject matter lies in less than all features of a single disclosed embodiment. Thus, the following claims are hereby incorporated into the Detailed Description, with each claim standing on its own as a separate embodiment.

The invention claimed is:

1. A power assist system for a manually powerable ridden vehicle, the system comprising:
   a motorized propulsion subsystem for propelling said vehicle;
   a plurality of speed modes having a corresponding maximum speed of movement of said vehicle for each speed mode provided by said motorized propulsion subsystem; and
   a control system controlling operation of said motorized propulsion subsystem, and controlling acceleration of said vehicle based on operation of an acceleration system, the acceleration system comprising:
      an automatic acceleration device causing said control system to provide automated acceleration of said vehicle, using said motorized propulsion subsystem, up to said maximum speed for a currently selected one of the plurality of speed modes based on a single activation of said automatic acceleration device by said rider and without operation of a braking device of said vehicle after said single activation,
      said control system providing said automatic acceleration using a smooth ramp up process comprising providing said automatic acceleration at a maximum acceleration rate of said motorized propulsion subsystem from a current speed of the vehicle up to a percentage of said maximum speed for the currently selected speed mode, and thereafter incrementally reducing the acceleration rate from the percentage of the maximum speed up to the maximum speed for the currently selected speed mode wherein no further acceleration is provided.

2. The system of claim 1, wherein said control system provides said smooth ramp up process incrementally reducing the acceleration rate by:
providing said automatic acceleration at a maximum acceleration rate of said motorized propulsion subsystem from an initial speed of the vehicle up to a first percentage of the maximum speed that is less than the maximum speed for the currently selected speed mode,
providing said automatic acceleration at a first percentage of said maximum acceleration rate, less than the maximum acceleration rate, from the first percentage of the maximum speed up to a second percentage of the maximum speed that is greater than the first percentage of the maximum speed but less than the maximum speed for the currently selected speed mode, and
providing said automatic acceleration at a second percentage of the maximum acceleration rate, less than the first percentage of the maximum acceleration rate, from the second percentage of the maximum speed up to a third percentage of the maximum speed that is greater than the second percentage of the maximum speed but less than the maximum speed of the vehicle for the currently selected speed mode.

3. The system of claim 2, wherein said control system provides said smooth ramp up process by further providing said automatic acceleration at a third percentage of the maximum acceleration rate, less than the second percentage of the maximum acceleration rate, from the third percentage of the maximum speed up to the maximum speed of the vehicle for the currently selected speed mode.

4. The system of claim 1, wherein said control system further provides said smooth ramp up process by:
providing said automatic acceleration at a first percentage of the maximum acceleration rate, less than the maximum acceleration rate, of said motorized propulsion subsystem from an initial speed of the vehicle up to a second speed of the vehicle that is greater than the initial speed but less than the maximum speed of the vehicle for the currently selected speed mode,
providing said automatic acceleration at a second percentage of the maximum acceleration rate, greater than the first percentage of the maximum acceleration rate but less than the maximum acceleration rate, from the second speed of the vehicle up to a third speed of the vehicle that is greater than the second speed but less than the maximum speed for the currently selected speed mode, and
providing said automatic acceleration at a third percentage of the maximum acceleration rate, greater than the second percentage of the maximum acceleration rate but less than the maximum acceleration rate, from the third speed of the vehicle up to a fourth speed of the vehicle that is greater than the third speed but less than the maximum speed for the currently selected speed mode.

5. The system of claim 4, wherein said control system provides said smooth ramp up process by further providing said automatic acceleration at the maximum acceleration rate from the fourth speed of the vehicle up to said percentage of said maximum speed for the currently selected speed mode, and thereafter incrementally reducing the acceleration rate.

6. The system of claim 4, wherein the initial speed of the vehicle is 0 mph.

7. The system of claim 4, wherein the initial speed of the vehicle is greater than 0 mph.

8. The system of claim 1, wherein said motorized propulsion subsystem is comprised in a power assist propulsion system, said power assist propulsion system further comprising:
a manual propulsion subsystem driving said power assist propulsion system for propelling said vehicle using manual input force from a rider of the vehicle; and
a transmission for transmitting said manual input force from said manual propulsion subsystem into a driving force for said vehicle.

9. The system of claim 8, wherein the manual propulsion subsystem comprises opposing rotational crankshafts driven by foot pedals configured to receive the manual input force from the rider.

10. The system of claim 1, wherein the ridden vehicle is a bicycle.

11. The system of claim 1, further comprising a transmission for transmitting said manual input force from said manual propulsion subsystem into a driving force for said vehicle.

12. An electric power assist system for a manually powerable ridden vehicle, the system comprising:
a power assist propulsion system for propelling said vehicle and comprising:
a manual propulsion subsystem driving said propulsion system using manual input force from a rider of the vehicle,
a motorized propulsion subsystem driving said propulsion system using electricity, and
one or more input sensors configured to detect said manual input force;
a speed sensor sensing a speed of movement of said vehicle;
a plurality of speed modes having a corresponding maximum speed of movement of said vehicle for each speed mode provided by said motorized propulsion subsystem;
a control system controlling operation of said motorized propulsion subsystem, said control system activating said motorized propulsion subsystem based on an amount of detected manual input force from the one or more input sensors, and ceasing said activating when a speed of movement of said vehicle achieves said maximum speed for a currently selected one of the plurality of speed modes;
an acceleration system comprising:
a manual acceleration device causing said control system to provide acceleration of said vehicle, using said motorized propulsion subsystem, while said manual acceleration device is operated by said rider, and
an automatic acceleration device causing said control system to provide automatic acceleration of said vehicle, using said motorized propulsion subsystem, up to said maximum speed for a currently selected one of the plurality of speed modes based on a single activation of said automatic acceleration device by said rider and without operation of a braking device of said vehicle after said single activation,
said control system providing said automatic acceleration using a smooth ramp up process comprising providing said automatic acceleration at a maximum acceleration rate of said motorized propulsion subsystem from a current speed of the vehicle up to a percentage of said maximum speed for the currently selected speed mode, and thereafter incrementally reducing the acceleration rate from the percentage of the maximum speed up to the maximum speed for the currently selected speed mode wherein no further acceleration is provided.

13. The system of claim 12, wherein said control system provides said smooth ramp up process incrementally reducing the acceleration rate by:
providing said automatic acceleration at a maximum acceleration rate of said motorized propulsion subsystem from an initial speed of the vehicle up to a first percentage of the maximum speed that is less than the maximum speed for the currently selected speed mode,
providing said automatic acceleration at a first percentage of said maximum acceleration rate, less than the maximum acceleration rate, from the first percentage of the maximum speed up to a second percentage of the maximum speed that is greater than the first percentage of the maximum speed but less than the maximum speed for the currently selected speed mode, and
providing said automatic acceleration at a second percentage of the maximum acceleration rate, less than the first percentage of the maximum acceleration rate, from the second percentage of the maximum speed up to a third percentage of the maximum speed that is greater than the second percentage of the maximum speed but less than the maximum speed of the vehicle for the currently selected speed mode.

14. The system of claim 13, wherein said control system provides said smooth ramp up process by further providing said automatic acceleration at a third percentage of the maximum acceleration rate, less than the second percentage of the maximum acceleration rate, from the third percentage of the maximum speed up to the maximum speed of the vehicle for the currently selected speed mode.

15. The system of claim 12, wherein said control system further provides said smooth ramp up process by:
providing said automatic acceleration at a first percentage of the maximum acceleration rate, less than the maximum acceleration rate, of said motorized propulsion subsystem from an initial speed of the vehicle up to a second speed of the vehicle that is greater than the initial speed but less than the maximum speed of the vehicle for the currently selected speed mode,
providing said automatic acceleration at a second percentage of the maximum acceleration rate, greater than the first percentage of the maximum acceleration rate but less than the maximum acceleration rate, from the second speed of the vehicle up to a third speed of the vehicle that is greater than the second speed but less than the maximum speed for the currently selected speed mode, and
providing said automatic acceleration at a third percentage of the maximum acceleration rate, greater than the second percentage of the maximum acceleration rate but less than the maximum acceleration rate, from the third speed of the vehicle up to a fourth speed of the vehicle that is greater than the third speed but less than the maximum speed for the currently selected speed mode.

16. The system of claim 15, wherein said control system provides said smooth ramp up process by further providing said automatic acceleration at the maximum acceleration rate from the fourth speed of the vehicle up to said percentage of said maximum speed for the currently selected speed mode, and thereafter incrementally reducing the acceleration rate.

17. The system of claim 15, wherein the initial speed of the vehicle is 0 mph.

18. The system of claim 15, wherein the initial speed of the vehicle is greater than 0 mph.

19. The system of claim 12, wherein the manual propulsion subsystem comprises opposing rotational crankshafts driven by foot pedals configured to receive the manual input force from the rider.

20. The system of claim 12, wherein the ridden vehicle is a bicycle.

* * * * *